July 29, 1947.     L. GRASSI     2,424,817
COMPACT OR VANITY
Filed March 24, 1945
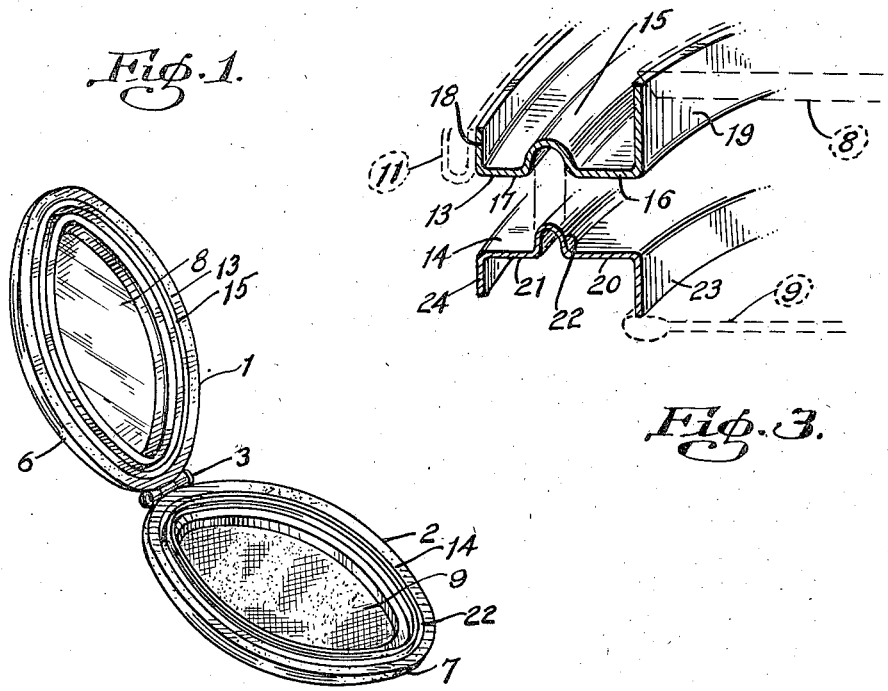
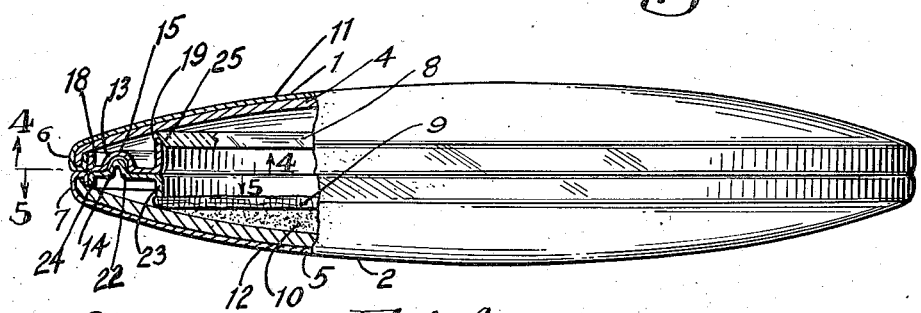
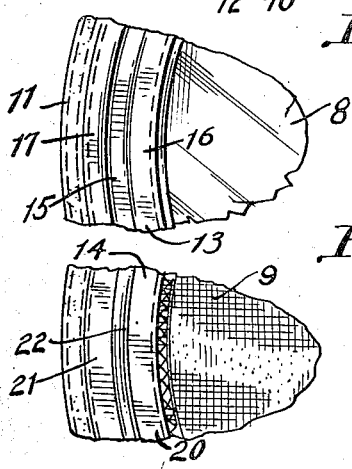
INVENTOR,
LOUIS GRASSI;
BY
ATTORNEY.

Patented July 29, 1947

2,424,817

UNITED STATES PATENT OFFICE 2,424,817

COMPACT OR VANITY

Louis Grassi, Los Angeles, Calif.

Application March 24, 1945, Serial No. 584,548

2 Claims. (Cl. 132—83)

The present invention relates to compacts or vanities, and has for an object the provision of a device of this character which is so constructed and arranged as to prevent loss of powder from said compact or vanity when closed.

Specifically, the invention contemplates the use of sifter powder, which is quite fine as to particle size, and in ordinary compacts readily escapes through the sifter and outwardly of the vanity.

A further object of the invention is the provision of a compact or vanity of few parts, in which the parts are so related that all component portions of the vanity or compact are held in working relationship in a simple manner.

A further object is the provision of a compact or vanity wherein novel means is provided for holding a sifter and mirror in position of service while at the same time functioning as a seal for preventing the escape of powder from the compact or vanity.

Another object of the invention is the provision in a compact or vanity of means whereby the majority of the parts thereof may be assembled without the use of solder or screws.

Another object is the provision of a compact or vanity wherein the parts utilized are few in number, which is inexpensive of construction, simple to manufacture and generally superior to devices now known to the inventor.

Whereas compacts or vanities now universally sold on the market embody many parts which of necessity complicate manufacture and add to expense, the present invention contemplates the use of rings which have a pressed-fit engagement within two members of the compact, and which rings so interengage as to provide an annular seal when the compact is closed to prevent loss of sifter powder therebetween, and which rings in addition to this function also hold a powder sifter in position of service and maintain a mirror in working relationship with one member of the vanity. The rings by their pressed-fit engagement within the case members do not require any further means to secure them in position of service.

With the heretofore mentioned objects in view the invention consists in the novel and useful provision, formation, construction, association and relative arrangement of parts, members and features, all as shown in a certain embodiment in the accompanying drawing, described generally and more particularly pointed out in the claims.

In the drawing:

Fig. 1 is a perspective view of a compact or vanity in open position;

Fig. 2 is a fragmentary transverse sectional view of the vanity showing its interior construction;

Fig. 3 is a fragmentary detached perspective view of certain elements entering into the construction of the vanity;

Fig. 4 is a fragmentary sectional view on the line 4—4 of Fig. 2; and,

Fig. 5 is a fragmentary sectional view on the line 5—5 of Fig. 2.

Referring now to the drawing:

In Fig. 1 I have shown one form of my invention wherein is disclosed a vanity or compact case including a cover 1 and a container 2, hinged together at 3. Preferably I use a type of hinge ordinarily known as a snap hinge, which will hold the cover and container in closed relationship without the necessity of providing a catch for this purpose. As so-called snap hinges are well known in the art, I do not describe the same herein. Preferably the cover and container are of identical form and are concavo-convex, as shown at 4 and 5. The cover and container are formed with annular flanges 6 and 7; thus in the manufacture of the present compact a single die may be utilized for the forming of the cover and the container, which greatly reduces manufacturing cost. It becomes evident that it makes no difference whether the member 1 is called the cover or the container. However, the two parts are distinguished in the present instance for ease of description. It is intended that the cover 1 should be provided on its inner surface or concave surface with a flat mirror 8, while the container 2 is provided on its inner or concave portion with a sifter 9. The sifter is usually of fabric, which permits the powder to pass therethrough, the powder being held between the sifter and the concave surface of the container, to wit: in the space 10. Preferably the convex surface of the cover and of the container is finished by securing thereover leather, fabric or other material, indicated at 11 and 12. In the instant case leather is contemplated, which may be ornamented to enhance its appearance, and the said leather is bent around the flanges 6 and 7 and glued thereto, so that the edge of the leather terminates adjacent the concave surface of the said cover and the container.

For the purpose of holding the mirror and sifter in position within the cover and container respectively, I provide two rings designated as entireties as 13 and 14. The ring 13 includes a part formed with a concave annular bead 15, two flat portions 16 and 17 on opposite sides of the said bead, the flat portions lying in the same plane, and an annular right angled portion 18 joined to the portion 17, and a right angled portion 19 joined to the portion 16. The portions 18 and 19 may be designated as flanges, and the said flanges are of different heights, th heights depending upon the curvature of the cover. The ring 14 includes two flat portions 20 and 21, which lie in the same plane and which are separated by an annular bead 22 with end flanges 23 and 24 in right-angular relationship to the flat portions 20 and 21 respectively. The bead 22 is convex outwardly with respect to the top surface of said ring and has a smaller diameter than the diameter of the concave bead 15, so as to fit loosely within said concave bead when the cover is closed against the container. Preferably the said rings are so formed as to have a tight pressed fit within the confines of the cover and container. For instance, the flange 18 has a close fit engagement with the covering material for the compact at the inner surface zone of flange 6; also the flange 24 of ring 14 is in close fit engagement with the covering 12 where said covering is glued to the inner surface of flange 7. When the rings are in position it is intended that the flange 19 should engage the beveled edge 25 of the mirror 8 to hold the same in position of service, while the flange 23 engages the sifter 9 and holds it in position of service within the container.

The operation, uses and advantages of the invention are as follows. As stated, the cover and container are identical in form, which simplifies manufacturing procedure as it makes no difference which of said members is utilized as the cover or as the container. Such a construction adds symmetry to the compact or vanity. After the two members of the case have been covered with leather or other material, the covering being held to said case members by gluing, the mirror is positioned within one of said members adjacent the concave surface thereof and one of the rings is placed in pressed-fit engagement against the covering material where it engages the flange of said cover or container. As the rings are springy in nature, the rings will be held quite tightly in position of service and not easily displaced. Accordingly, one flange of the ring will engage either the sifter or the mirror to hold these members within the case. When the case is closed the smaller convex bead of ring 14 loosely enters the concave bead 15, without snap engagement, and in such a manner as to form a seal at this zone and thus prevent escape of sifter powder therebetween.

It will be noted that there is a space between the outer surface of the mirror and the inner surface of the sifter, and such space may be utilized for holding a powder puff.

In the event that the sifter powder requires renewing, it is a simple matter to pry the ring from the cover and remove the sifter and replace the powder. The same is true for the mirror in case of accidental breakage thereof, a new mirror being readily positioned by the simple expedient of removing the ring 13. This is a feature of the invention, because the average compact is not constructed to permit renewal of a mirror in case of breakage.

I claim:

1. A vanity case, including two members, one of which acts as a cover and the other of which acts as a container for powder, a sifter within the container through which the powder passes, an annular ring in pressed-fit engagement with the container for holding the sifter in working relationship to the container, said annular ring provided with an annular convex bead, a second annular ring in pressed-fit engagement with the cover, the said second annular ring formed with an annular groove, a mirror within said cover and held in position by said second annular ring; the said annular bead adapted to enter the annular groove when the cover is closed to the container to act as a seal against escape of powder from said case.

2. The combination in a compact case having a cover member and a container member, of an annular ring for the interior of each of said compact case members, each annular ring provided with two spaced-apart concentric flanges and an intermediate flat wall therebetween, said intermediate flat wall formed with an annular concavo-convex bead; the outermost flange of each ring having a pressed-fit engagement with a compact case member; and the concavo-convex bead of one ring nesting within the concavo-convex bead of the other ring when the cover member and the container member are closed.

LOUIS GRASSI.

REFERENCES CITED

The following references are of record in the file of this patent:

UNITED STATES PATENTS

| Number | Name | Date |
| --- | --- | --- |
| 1,841,933 | Bowers | Jan. 19, 1932 |
| 1,562,455 | Jones | Nov. 24, 1925 |
| 1,692,041 | Klein | Nov. 20, 1928 |
| 1,598,991 | Strauss | Sept. 7, 1926 |
| 1,642,188 | Younghusband | Sept. 13, 1927 |